J. STURROCK & D. A. SCHUTT.
LID RETAINING MECHANISM.
APPLICATION FILED APR. 13, 1911.
1,001,477.
Patented Aug. 22, 1911.
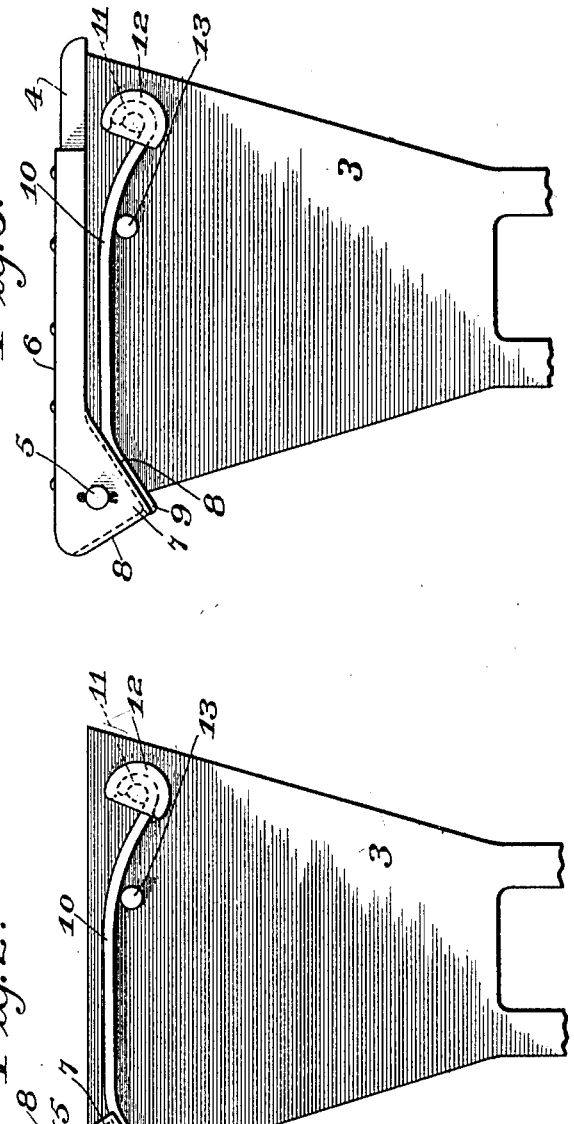
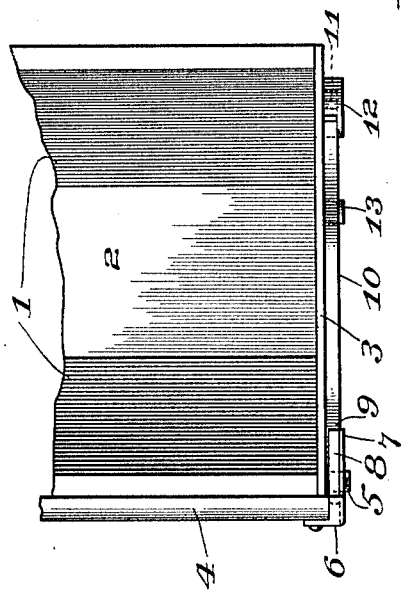
Witnesses:
C. C. Palmer
F. W. Hoffmaster
Inventors.
John Sturrock
and Duny A. Schutt.
By O. W. Burgess
Attorney.

UNITED STATES PATENT OFFICE.

JOHN STURROCK AND DUNY A. SCHUTT, OF CHICAGO, ILLINOIS, ASSIGNORS TO INTERNATIONAL HARVESTER COMPANY, A CORPORATION OF NEW JERSEY.

LID-RETAINING MECHANISM.

1,001,477.  Specification of Letters Patent.  Patented Aug. 22, 1911.

Application filed April 13, 1911.  Serial No. 620,781.

*To all whom it may concern:*

Be it known that we, JOHN STURROCK, a subject of the King of Great Britain, and DUNY A. SCHUTT, a citizen of the United States, residing at Chicago, in the county of Cook and State of Illinois, have invented certain new and useful Improvements in Lid-Retaining Mechanism, of which the following is a specification.

Our invention relates to means for yieldingly retaining a lid, which is hinged to one side of a receptacle, either in a closed or open position, and is adapted in particular for use in connection with the feed hoppers of grain drills, and consists of a spring having one end secured to the end wall of the hopper, and its opposite end adapted to contact with heel portions upon opposite sides of a movable member of the hinge connection in a manner to yieldingly retain the lid in an open or closed position; the object of our invention being to provide simple, cheap and efficient means for the purpose required. We attain this object by means of the mechanism illustrated by the accompanying drawings, in which—

Figure 1 represents a top view of one end of a feed hopper for grain drills with the hinged lid in an open position and having our invention connected therewith; Fig. 2 is an end elevation of Fig. 1 representing the lid of the hopper in its open position; and Fig. 3 is a similar figure representing the lid in a closed position.

The same reference characters designate like parts throughout the several views.

1 represents the side walls of the hopper that are inclined inward and downward, 2 the bottom, 3 one of the end walls thereof, and 4 the lid. The end walls of such hoppers are commonly made of metal, and 5 represents a laterally projecting cylindrical hinge member integral with an end wall of the kind indicated and located at one of its upper corners. 6 represents one of the hinge members that are secured to opposite ends of lid 4 and provided with an ear member 7 having a lateral opening therein that loosely receives the hinge member 5 in a manner to turn about its axis. The ear member 7 is provided with heel portions 8 that are arranged at substantially right angles with each other and diverge toward the part 6 upon opposite sides of the axis of the hinge. The heel portions are preferably provided with grooves upon their edges adapted to receive one end 9 of a spring 10 that has its opposite end provided with an eye portion 11 that is received by a curved socket member 12 integral with the end wall of the hopper, and 13 represents a cylindrical boss projecting laterally from the end of the hopper and forming a fulcrum that engages with the body portion of the spring in a manner to prevent a turning movement of the eye in the socket in one direction, the opposite end of the spring being turned downward at an angle with the body portion and yieldingly held in contact with the heel portions of the hinge member as the lid is turned about its hinge connections, the spring contacting with either surface of the heel depending upon whether the lid is open or closed.

What we claim as our invention, and desire to secure by Letters Patent, is:

1. A lid retaining mechanism including, in combination, a receptacle including side and end walls, a lid having a hinge connection with said end walls, said hinge connection including a member having angularly disposed heel portions upon opposite sides of the axis of the hinge connection, a spring having one end adapted to engage with said heel portions, the opposite end of said spring being provided with an eye portion, and a curved socket member integral with one of the end walls of said receptacle and adapted to receive said eye portion.

2. A lid retaining mechanism including, in combination, a receptacle including side and end walls, a lid having a hinge connection with said end walls, said hinge connection including a member having angularly disposed heel portions upon opposite sides of the axis of the hinge connection, a spring having one end adapted to engage with said heel portions, the opposite end of said spring being provided with an eye portion, a curved socket member integral with one of the end walls of said receptacle and adapted to receive said eye portion, and a fulcrum member engaging with the body portion of said spring.

JOHN STURROCK.
DUNY A. SCHUTT.

Witnesses:
W. R. HARVEY,
A. W. TEUFEL.